US011934469B2

(12) United States Patent
Miller et al.

(10) Patent No.: US 11,934,469 B2
(45) Date of Patent: Mar. 19, 2024

(54) GRAPH-BASED RECOMMENDATIONS OF DIGITAL MEDIA COLLABORATORS

(71) Applicant: PearPop Inc., Los Angeles, CA (US)

(72) Inventors: Joseph Miller, New Hope, PA (US); Vincent D. Tuscano, Los Angeles, CA (US); Cole A. Mason, Los Angeles, CA (US)

(73) Assignee: PearPop Inc., Los Angeles, CA (US)

( * ) Notice: Subject to any disclaimer, the term of this patent is extended or adjusted under 35 U.S.C. 154(b) by 312 days.

(21) Appl. No.: 17/395,967

(22) Filed: Aug. 6, 2021

(65) Prior Publication Data

US 2023/0044250 A1 Feb. 9, 2023

(51) Int. Cl.
| | |
|---|---|
| *G06Q 30/00* | (2023.01) |
| *G06F 9/54* | (2006.01) |
| *G06F 16/901* | (2019.01) |
| *G06F 16/9535* | (2019.01) |
| *G06F 16/9538* | (2019.01) |
| *G06Q 30/0601* | (2023.01) |

(52) U.S. Cl.
CPC .......... *G06F 16/9535* (2019.01); *G06F 9/547* (2013.01); *G06F 16/9024* (2019.01); *G06F 16/9538* (2019.01); *G06Q 30/0631* (2013.01)

(58) Field of Classification Search
CPC .................................................. G06Q 30/0631
See application file for complete search history.

(56) References Cited

U.S. PATENT DOCUMENTS

| | | |
|---|---|---|
| 2014/0089322 A1 | 3/2014 | Garcia |
| 2016/0057180 A1 | 2/2016 | Beckley |
| 2018/0113877 A1 | 4/2018 | Krishnakumar |
| 2021/0124464 A1 | 4/2021 | Verdugo |

OTHER PUBLICATIONS

Yan, Ming, Jitao Sang, and Changsheng Xu. "Unified youtube video recommendation via cross-network collaboration." Proceedings of the 5th ACM on International Conference on Multimedia Retrieval. 2015.*
Ming Yan et al., "Unified youtube video recommendation via cross-network collaboration", Proceedings of the 5th ACM on International Conference on Multimedia Retrieval, 2015, 8 pages.

* cited by examiner

*Primary Examiner* — Kathleen Palavecino
(74) *Attorney, Agent, or Firm* — Baker Botts L.L.P.

(57) ABSTRACT

In an embodiment, the disclosure provides computer-implemented systems and methods for providing graph-based recommendations of digital media collaborators for content creators. In an embodiment, the disclosure provides computers programmed to implement a networked, online platform for facilitating collaboration between content creators. In an example embodiment, the platform provides a system for recommending a collaborator for a particular content creator to create content with, of a specific content type. In another example embodiment, the platform provides a system for recommending a collaborator for a particular content creator to create content with, without restricting the content type, using a community detection algorithm. In embodiments, recommendations may be made partly based on centrality measures of creator nodes on a network graph programmatically calculated between content nodes of that network graph, or content nodes of a community detected in the network graph. Recommendations may also be informed by characterizations of followers of content creators.

6 Claims, 8 Drawing Sheets

GRAPH-BASED RECOMMENDATIONS OF DIGITAL MEDIA COLLABORATORS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 PearPop Inc.

TECHNICAL FIELD

One technical field is the automatic generation of recommendations, specifically the automatic generation of recommendations of sets of content creators for the production of digital media collaborations. Another technical field is recommendations systems operating fully under programmatic control, specifically the incorporation of network graph representations of content creators and content types defined by an ontology into recommendations systems implemented via client-server Software as a Service techniques or distributed computer systems generally.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today's technology enables the creation and sharing of a vast array of digital content with an unprecedent number of consumers. Video recording artists, for example, can reach audiences spread across the globe, and short-form video recording and sharing applications such as TIKTOK and INSTAGRAM have become widely successful. Social media influencer has emerged as genuine career path that has made a not-inconsequential set of individuals highly wealthy while providing engaging content for casual viewers and devoted fans alike.

Moreover, rich digital media content that becomes virally popular often represents a confluence of talent, including talent related to the creation of audio, video, choreography, acting, directing, and production; and, a final published digital media composition may span a variety of diverse content types or categories (e.g., cooking, lip-sync, dancing, sports, fashion, etc.). Indeed, studies have shown that collaborative content may be more exciting to viewers, and may drive more user engagement, than non-collaborative content. Thus, some of the most successful digital content—wherein success may be defined, e.g., by a number views or likes of a short-form video, or by an increase in followers for its creators—involve collaboration between multiple content creators or artists. But with so many content creators existing in the content creator and influencer ecosystem, it is quite difficult for content creators to independently determine which other content creators would be ideal candidates with which to collaborate.

In particular, a problem faced by content creators is a difficulty in expanding into a new content type. For example, a content creator that has a sizable fan base comprising followers who enjoy sketch comedy, but desires to grow their brand around their dance skills, may be at a loss for an efficient and actionable solution. On the other hand, a content creator that wishes to effectively grow a fan base or follower count on a social media platform without feeling the need to focus on production of a specific type of content faces a distinct but related problem: which other content creators should the content creator seek to collaborate with to create the most engaging, and brand-developing, content? If a technical solution could be created that addressed the aforementioned issues, then it would represent a significant advance in the state of the art.

SUMMARY

The appended claims may serve as a summary of the invention.

DETAILED DESCRIPTION

Figure 1:
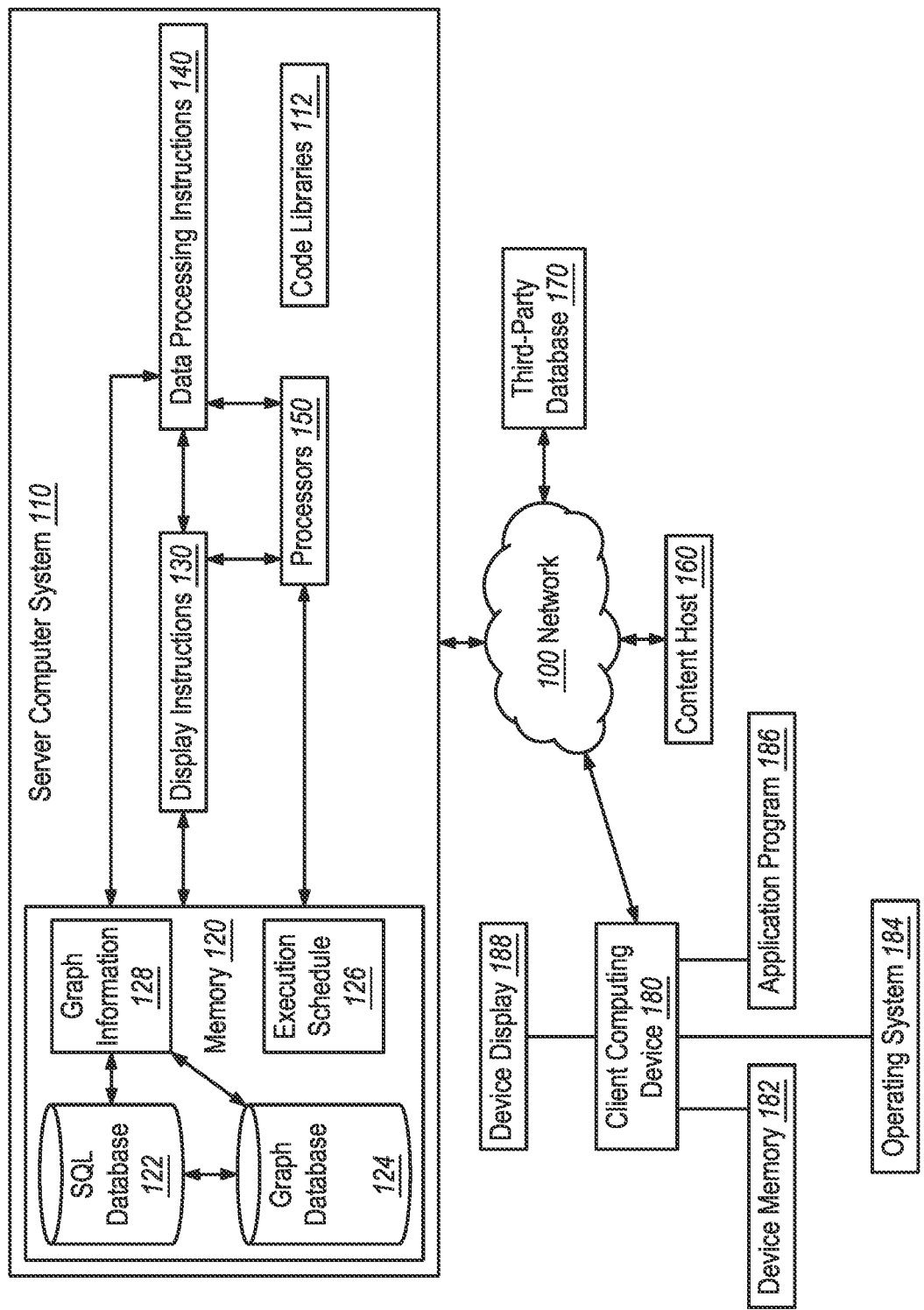
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
2.1 The Network Graph
2.2 Community Detection
2.3 Centrality Measures
2.4 Collaborator Recommendations
   2.4.1 Content Type-Specific Recommendations
   2.4.2 General Recommendations using Community Detection
3. Implementation Example—Hardware Overview 1. General Overview In an embodiment, the disclosure provides computer-implemented systems and methods for providing graph-based recommendations of digital media collaborators for content creators. In an embodiment, the disclosure provides computers programmed to implement a networked, online platform for facilitating collaboration between content creators and producers. "platform," in this context, refers to a combination of a server-side application and a client-side application that execute independently but communicate and interoperate to execute substantive functions as further described herein. Collaboration, in this context, may include message communications, facilities for recording short-form videos or other media, and sharing the media. The platform may provide software tools, accessible using mobile computing devices or other computers, for digital content creation, editing, and distribution. These tools may interoperate with computer-implemented digital payment services, and recommendation algorithms that are programmed, in part, to execute targeted association of content creators capable of collaborative recording with others and/or forming a mutually beneficial relationship with others.

The technology disclosed herein facilitates the generation of graph-based recommendations in various ways. Some methods involve, receiving, generating, or storing a network graph representing a network of content creators involved in the creation of various content types defined by an ontology, wherein creator nodes and content nodes are connected by connecting edges. An edge that connects a creator node and a content node may represent a strength of association between a content creator corresponding to the creator node and a content type of the ontology corresponding to the content node. Creator nodes may also be associated with sets of followers following corresponding creators on social media websites like TIKTOK or INSTAGRAM.

In a first non-limiting embodiment, the platform provides a system for recommending a collaborator for a particular content creator to create content with, of a specific content type. In a second non-limiting embodiment, the platform provides a system for recommending a collaborator for a particular content creator to create content with, without restricting the content type, using a community detection algorithm. The community detection algorithm may detect communities of closely related nodes ("neighborhoods") in the network graph. These communities or neighborhoods may comprise, in particular, closely related content nodes and one or more creator nodes that they may be connected to, by edges. In embodiments, recommendations may be made at least partly based on centrality measures of creator nodes programmatically calculated between content nodes of the network graph, or content nodes of a community (a sub-graph portion of the network graph). As explained further herein, recommendations may also be informed by characterizations of the sets of followers.

A first example computer-implemented method for recommending one or more digital media collaborators involves: receiving, at a server computer, a representation of a network graph including a plurality of nodes and a plurality of edges, the plurality of nodes including a plurality of creator nodes and a plurality of content nodes, each content node corresponding to a respective content type of a plurality of content types defined by an ontology, each creator node corresponding to a respective content creator, each creator node being associated with one or more respective content types and a respective set of followers, and each creator node being connected, by an edge, to each content node that corresponds to a content type with which that creator node is associated; receiving, at the server computer, a first input including a specification of a particular content creator; programmatically identifying the creator node corresponding to the particular content creator and a particular content type with which that creator node is most strongly associated; receiving, at the server computer, a second input including a specification of a specific content type; programmatically identifying a set of specific creator nodes associated with the specific content type; for each node of the set of specific creator nodes, programmatically calculating a respective specific centrality measure of that node between the content node corresponding to the particular content type and the content node corresponding to the specific content type, based, in part, on stored characterizations of the set of followers associated with each node of the set of specific creator nodes; programmatically generating recommendation data identifying the content creator corresponding to the specific creator node with the highest calculated specific centrality measure; and causing to be displayed, in a graphical user interface displayed on a display of a client computing device, the recommendation data.

In an embodiment, the second input is received from the client computing device.

In an embodiment, a method involves transmitting to the client computing device control instructions formatted to cause displaying of a prompt and a data entry field in a panel of the graphical user interface, the prompt including a text-based message requesting a specification of one or more desired content types; and receiving, from the client computing device, via the data entry field, the second input including the specification of the one or more desired content types, the particular content type being one of the one or more desired content types.

In an embodiment, a method is initiated responsive to receiving, from the client computing device, a request to initiate a recommendation process, the particular content creator being a content creator associated with the request, and the request to initiate the recommendation process triggering control instructions to be transmitted to the client computing device.

In an embodiment, the data entry field includes a text entry field.

In an embodiment, the data entry field includes a drop-down list including content types of the plurality of content types defined by the ontology.

In an embodiment, the second input is received from the server computer.

In an embodiment, the second input is generated by: programmatically determining, using a community detection algorithm, a plurality of communities detected to exist within the network graph, each community including both a corresponding set of community nodes which is a subset of the plurality of nodes of the network graph and a corresponding set of community edges that connect certain nodes of the corresponding set of community nodes based on the community detection algorithm; programmatically determining the particular community including a content node corresponding to the particular content type; and programmatically selecting a content type from among the content types corresponding to content nodes comprised by the particular community, but which is not the particular content type, to be specified by the second input.

In an embodiment, the stored characterizations of the respective set of followers associated with each creator node includes a characterization of at least one of a number of followers in the set, a measure of an activity level of the followers in the set, or preferences of the followers in the set being determined at least partly based on a history of at least a subset of the followers in the set at least one of creating, sharing, or liking short-form digital videos corresponding to one or more content types defined by the ontology.

In an embodiment, a method involves generating the stored characterizations using automatic API calls to one or more content host platforms each including an API.

A second example computer-implemented method for programmatically recommending sets of collaborators to produce digital media collaborations involves: receiving, at a server computer, a representation of a network graph including a plurality of nodes and a plurality of edges, the plurality of nodes including a plurality of creator nodes and a plurality of content nodes, each content node corresponding to a respective content type of a plurality of content types defined by an ontology, each creator node corresponding to a respective content creator, each creator node being associated with one or more respective content types and a respective set of followers, and each creator node being connected, by an edge, to each content node that corresponds to a content type with which that creator node is associated; programmatically determining, using a community detection algorithm, a plurality of communities detected to exist within the network graph, each community including both a corresponding set of community nodes which is a subset of the plurality of nodes of the network graph and a corresponding set of community edges that connect certain nodes of the corresponding set of community nodes based on the community detection algorithm; receiving, at the server computer, an input including a specification of a particular content creator; programmatically identifying the creator node corresponding to the particular content creator and one or more particular content types with which that creator node is most strongly associated; programmatically identifying one or more particular communities that include a content node corresponding to one of the one or more particular content types; programmatically identifying a set of specific creator nodes associated with at least one of the one or more particular content types and comprised by at least one of the one or more particular communities; for each node of the set of specific creator nodes, programmatically determining one or more specific content types with which that creator node is most strongly associated; for each node of the set of specific creator nodes, programmatically calculating a respective specific centrality measure of that node between each content node corresponding to each of the particular content types and each content node corresponding to each of the specific content types, based, in part, on stored characterizations of the set of followers of each node of the set of specific creator nodes; programmatically generating recommendation data identifying a prime content creator corresponding to the specific creator node with the highest calculated specific centrality measure, the recommendation data also identifying the content type most strongly associated with the specific creator node of the prime content creator; and causing to be displayed, in a graphical user interface displayed on a display of a client computing device, the recommendation data.

In an embodiment, the input is received from the client computing device.

In an embodiment, the input is received from the server computer.

In an embodiment, the input is automatically periodically generated according to an execution schedule stored in memory of the server computer.

In an embodiment, a plurality of the content creators including the prime content creator each are respectively associated with a corresponding collaboration price; and the recommendation data further identifies one or more additional content creators corresponding to creator nodes that are associated with similar content types as the creator node corresponding to the prime content creator, the one or more additional content creators each being associated with a collaboration price less than the collaboration price associated with the prime content creator.

In an embodiment, a method involves causing to be displayed, in the graphical user interface, inference data representing at least one of an ex-ante or ex-post causal inference prediction of an effect of the particular content creator participating in a collaboration with the identified prime content creator.

2. Structural & Functional Overview

FIG. 1 illustrates a distributed computer system showing the context of use and principal functional elements with which one embodiment could be implemented. In an embodiment, server computer system 110 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1, for one embodiment, depicts a server computer system 110 comprising one or more processors 150 coupled via network 100 to a client computing device 180, a third-party database 170, and a content host 160. In an embodiment, server computer system 110 is programmed to execute the functions described herein and related to graph-based recommendations of digital media collaborators, as further described in other sections herein. Server computer system 110 may comprise one or more processors, cores, clusters, computers, servers, and/or virtual machine instances, hosted or executing in an enterprise, private datacenter, public datacenter and/or cloud computing service.

In some embodiments, the client computing device 180 may be a smartphone, laptop computer, desktop computer, tablet, or any other type of computing device comprising one or more hardware processors or processor cores. In some embodiments, the client computing device comprises an operating system 184, device memory 182, and a device display 188. In some embodiments, client computing device 180 hosts and executes a client application program 186, which the client computing device may download and install from server computer system 110, an application store, or other repository. The client application program 186 is compatible with server computer system 110 and communicates with the computer system using an app-specific protocol, parameterized HTTP POST and GET requests, and/or other programmatic calls. In some embodiments, client application program 186 comprises a conventional internet browser application that is capable of communicating over network 100 to other functional elements via HTTP and capable of rendering dynamic or static HTML, XML, or other markup languages, including displaying text, images, accessing video windows and players, and so forth.

In embodiments, the third-party database 170 may be an FTP site, cloud storage system, relational database, data lake, or other electronic digital system programmed for data storage, querying, and retrieval. In embodiments, the third-party database 170 is an InterPlanetary File System (IPFS). Third-party database 170 may comprise networked storage in private or public cloud storage systems, file sharing systems, network attached storage, and so forth.

In an embodiment, the content host 160 is a social media content sharing computer, service or website that is programmed to receive, store and host audiovisual programs, such as short-form user-created videos that are uploaded to content host 160 from mobile computing devices, desktop computers, or other devices. Presently known commercial examples include TIKTOK and INSTAGRAM, but other embodiments may use functionally equivalent or functionally similar services of other providers. A video, audiovisual program or recording, or other digital content item that the content host 160 hosts may be associated with metrics, such as a number of views, likes, shares, or comments associated with the video, that are digitally stored in tables of the third-party database 170, or memory 120 of the server computer system 110 which may comprise a SQL database 122 or other accessible memory. Metrics of this type may be obtained using programmatic means such as API calls, parameterized HTTP POST or GET requests, or calls or method invocations in application-specific protocols.

In embodiments, server computer system 110 comprises logic or sequences of instructions that are formatted to cause the execution of functions that are described herein. In a nonlimiting example, server computer system 110 may comprise display instructions 130 and data processing instructions 140. The data processing instructions 140 may be formatted to cause execution of functions such as programmatically extracting graph data from the SQL database 122, transforming the graph data, and storing a network graph in a graph database 124 which is comprised by the memory 120 of server computer system 110. Database 124 may be implemented using NEO4J, for example. The data processing instructions 140 may be formatted to cause execution of a variety of other functions when executed by the processors 150, including functions for detecting communities in a network graph, functions for identifying nodes in a network graph associated with certain data or metadata, and functions for computing centrality measures, or other functions. In order to execute certain functions, server computer system 110 may use code libraries 112 in a programming language such as PYTHON, for example PANDA, NETWORKX, PY2NEO, KERAS, TENSORFLOW, PANDAS, or another library which may be stored in memory 120 or other digital storage accessible by server computer 110 or may be available dynamically over the network 100. Graph information 128 related to one or more network graphs may also be stored in memory 120, including in SQL database 122 or graph database 124.

In an embodiment, instructions executed at server computer system 110 are organized as a web application or app that is programmed to communicate with browsers or client apps via HTTP. In embodiment, the display instructions 130 are formatted to cause displaying of graphics, graphs, graphical user interfaces, visualizations, or other image data on the device display 188 of client computing device 180 or another display. In an embodiment, some instructions are automatically executed according to an execution schedule 126 stored in the memory 120 of server computer system 110.

2.1 the Network Graph

Embodiments of the disclosed technology involve forming and manipulating a network graph in computer memory to support data storage, transformation, analysis, and output operations. Generally, a network graph may be implemented as a digital data structure capable of representing relationships between data objects ("nodes") using links ("edges"). Edges may connect a pair of nodes in a network graph, implying an association, relationship, correspondence, dependence, or other relation between the nodes. In some instances, an edge has a direction from a first node toward a second node, but any edge also may comprise a directionless link.

Edges may have weights and not all edges of a network graph are necessarily equivalent; for example, a first pair of nodes may be more strongly associated with each other than a second pair of nodes are associated with each other. A network graph may be stored using digital data in main memory and also visually rendered to a computer display screen via presentation instructions, which may be programmed to traverse the graph in memory and output a visual representation of nodes and edges. Commonly, when network graphs are visualized, for example on a computing device display screen, there may be a meaning associated with the sizes, shapes, and colors of the nodes and edges. For example, stronger associations between nodes may be visualized with a thicker line, a different color line, or a shorter line connecting respective nodes. Similarly not all nodes are necessarily equivalent, some nodes might reflect a higher weight, value, or importance in relation to operations that use or transform the graph, and could be visualized as a different color point or circle, a larger point or circle, or in another way. Regardless of how a network graph may be visualized, it can thus be used to represent complex relations between objects, which are represented as nodes in the network graph, connected by edges, which may represent a strength, type, or closeness of relation between the represented objects.

Figure 4A:
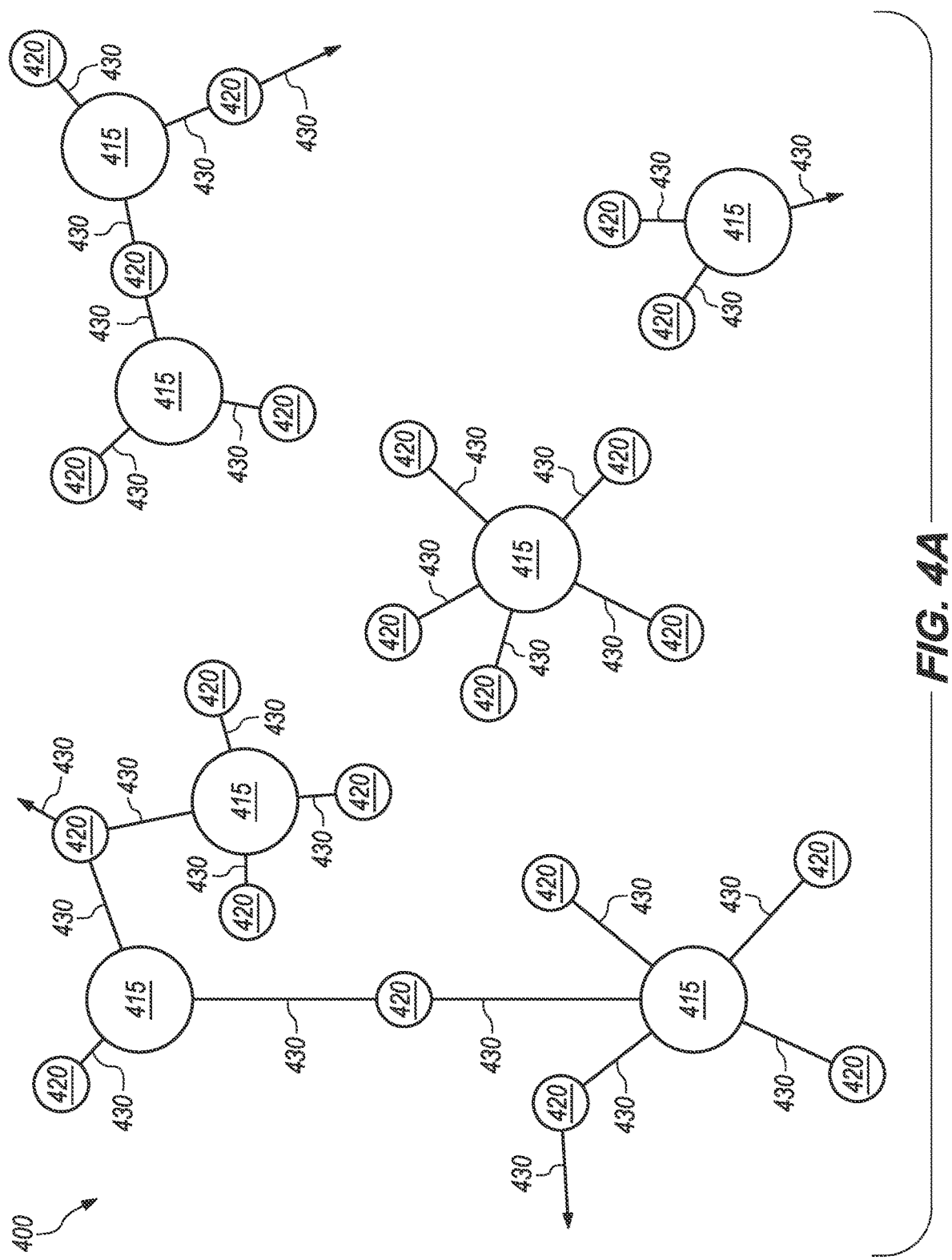
FIG. 4A depicts a visualization of a portion of a network graph comprising creator nodes, content nodes, and connecting edges, in an embodiment.
Figure 4B:
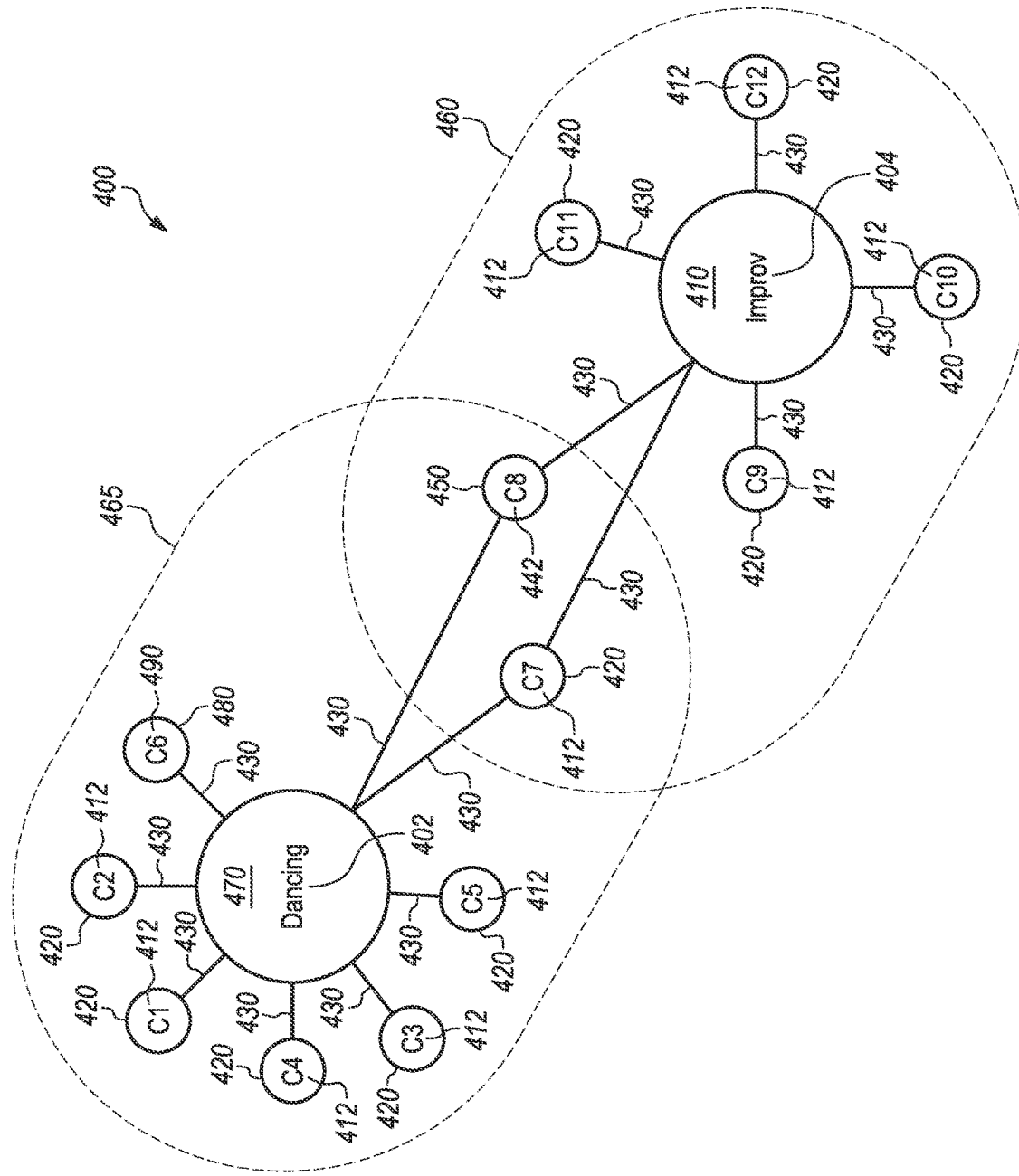
FIG. 4B depicts a visualization of a portion of a network graph comprising creator nodes, content nodes, and connecting edges, focusing on two content nodes, in an embodiment.

FIG. 4A depicts a visualization of a portion of a network graph 400 comprising creator nodes 420, content nodes 415, and connecting edges 430, in an embodiment, while FIG. 4B depicts a visualization of a portion of a network graph 400 comprising creator nodes 420, content nodes 420, and connecting edges 430, focusing on two content nodes 415, in an embodiment.

Systems and methods disclosed herein involve receiving such a network graph 400 at the server computer system 110. Information defining the network graph 400 may be stored, at times, in SQL database 122 or another relational database. In embodiments, the network graph information 128 may be programmatically extracted from SQL database 122, transformed or formatted, and then stored as a network graph 400 in graph database 124. The aforementioned extraction, transformation, and storage process may be accomplished with the aid of code libraries such as the PY2NEO library using the PYTHON language.

In embodiments, each creator node 420 of the network graph 400 may represent a unique content creator 412 in a one-to-one correspondence with a certain creator node 420. A content creator 412 may be an individual or entity that creates digital media content published electronically to a content host 160. The content host 160 may be a social media content sharing computer, service or website that is programmed to receive, store and host audiovisual programs, such as short-form user-created videos that are uploaded to content host 160 from mobile computing devices, desktop computers, or other devices. Presently known commercial examples include TIKTOK and INSTAGRAM, but embodiments may use functionally equivalent or functionally similar services of other providers.

In embodiments, a variety of graph information 128 related to creator nodes 420 and content creators 412 may be incorporated into a network graph 400, including information about one or more types of content 402 associated with a certain content creator 412. For example, a creator node 420 may be associated with a content score value for each of one or more content types 402 defined by an ontology, the content score value reflecting a strength of association between the content creator 412 and the content type 402. These content score values may comprise floating point or real number values that range from [0 to 1] and may represent an approximate percentage of the content creator's 412 published digital content that is associated with a certain content type 402, or the content score values may exist within a different range or on a different scale. These content score values may be part of the graph information 128 stored in the SQL database 122 or elsewhere.

The ontology defining the various content types 402 may reflect the types of content that are hosted by one or more of the content hosts 160, and may comprise categories, styles, or types of short-form videos such as, by way of example only, dancing, beach, cooking, fishing, fashion, DIY, self-help, sketch comedy, reactions, health, beauty, sports, music, education, science, history, improvisation, lip sync, gardening, mediation, or other categories or styles of digital media content. Each content type 402 may correspond to a unique content node 415 in the network graph 400. The ontology and the various content types 402 defined by it, and the content nodes 415 respectively corresponding to each content type, may be part of the graph information 128 stored in the SQL database 122 or elsewhere.

In another example, a creator node 420 may be associated with a follower score value or other characterization of one or more sets of followers associated with a corresponding content creator 412 on a content host 160 such as TIKTOK or INSTAGRAM. The follower score value may represent a total number of followers and range from zero to ten billion, or it may be weighted, for example by an activity level of the one or more sets of followers. For example, an activity score value in the range [0, 1] may multiply the follower score value to reflect an activity-modified follower score value.

In another example, a realness score value in the range [0,1] may multiply the follower score value to reflect a realness-modified follower score value. The realness-score-value weighting may characterize a portion of the user accounts following the content creator 412 that are real, individual accounts, as opposed to fake account, bot accounts, duplicate accounts, inactive, banned, or dead accounts, or another type of account not desired for inclusion in the follower score value.

In a third example, one or more sets of followers may be characterized by the types of content that the followers of the set typically consume. This follower content characterization may be based on creation, views, likes, comments, or shares of short-form videos existing on the content host 160 performed by one or more followers of a set of followers of the content creator 412, and may be extracted programmatically from a content host 160 by the server computer using automatic API calls and then digitally stored in SQL database 122, or obtained through another method. The aforementioned characterizations, each of which may be applied to one or more sets of followers, are examples only, and it should be understood that followers may also be characterized in other logical ways. These characterizations and other described information related to creator nodes may be part of the graph information 128 stored in the SQL database 122 or elsewhere.

In some embodiments, the aforementioned follower characterizations may be accomplished automatically by executing data processing instructions 140 formatted to cause algorithmically training a machine learning classifier to classify the followers of a set of followers based on activity (e.g., the aforementioned activity score value [0, 1]), realness (e.g., the aforementioned realness score value [0, 1]), content preferences, or other labels. A training data set could be developed by scraping comments and subtitles from short-form videos hosted by host platforms, executing speech to text to transform audio into a digital transcript and executing object detection to determine subjects of a short-form video, in addition to obtaining information using programmatic API calls.

In some embodiments, a similar process can be used to characterize creator nodes 415 by training a machine learning classifier to classify the content produced by corresponding content creators 412 in order to obtain the aforementioned content score values [0, 1] reflecting a strength of association between a content creator 412 and a content type 402 reflected as an edge 430 in the network graph 400. In other embodiments, such labeling to create a training data set may instead be done by human labelers, and a model training and classification process may receive the human-labeled training data set electronically, as input at server computer 110, and only then proceed to train and classify under full programmatic control.

In one embodiment, connecting edges 430 only connect creator nodes 420 to content nodes 415, and do not connect creator nodes 420 to one another or content nodes 415 to one another. The edges 430 may reflect a strength of association between the creator node 420 (or content creator 412 corresponding to that creator node 420) and the connected content node 415 (or content type 402 corresponding to that content node 415). This strength of association associated with an edge 430 may depend on the content score value [0, 1] that may be associated, as previously explained, between a content creator 412 and a content type 402, or it may be dependent on other factors, such as characterizations of one or more sets of followers of the content creator 412. The edges 430 information may be part of the graph information 128 stored in the SQL database 122 or elsewhere.

2.2 Community Detection

Figure 4C:
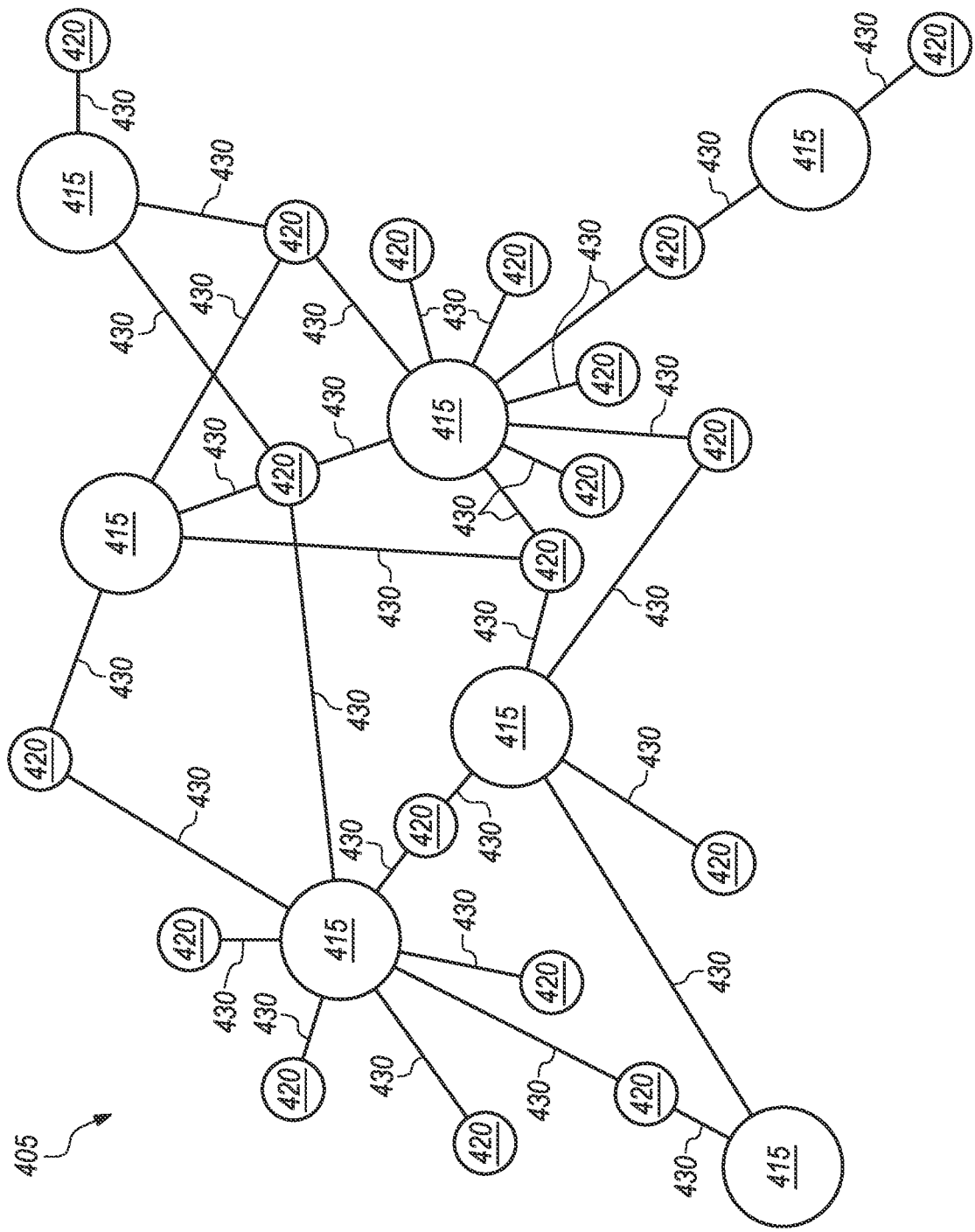
FIG. 4C depicts a visualization of a community sub-graph detected in a network graph comprising creator nodes, content nodes, and connecting edges, in an embodiment.

FIG. 4C depicts a visualization of a community 405 sub-graph detected in a network graph comprising creator nodes 420, content nodes 415, and connecting edges 430, in an embodiment. A community 405 may be defined, with respect to a graph, as a subset of nodes that are densely connected to each other and loosely connected to the nodes in the other communities 405 of the graph. With respect to network graph 400, a community 405 may comprise creator nodes 420 and content nodes 415 programmatically detected to be closely related by server computer system 110 using a community detection algorithm. The connecting edges 430 shown in the community 405 of FIG. 4C represent relations between creator nodes 420 and content nodes 415 as described further herein with more specificity. Server computer system 110 may execute data processing instructions 140 formatted to cause execution of a community detection algorithm that involves agglomerative or divisive methods, and examples of particular community detection algorithms are provided herein; but, one of ordinary skill in the art will recognize that other options with similar functionality are possible.

In embodiments, in order to execute a community detection algorithm, server computer system 110 may use functionality of a variety of code libraries, including NETWORKX, PANDAS, or other libraries. A community detection algorithm may comprise measures or sub steps such as computing PageRank, Centrality, Betweenness Centrality, Luvain network detection, random walk network detection, or others. Communities may be detected using networkX, for example, by using built-in algorithms, such as a Girvan-Newman algorithm, a Fluid Communities algorithm, a Label Propagation algorithm, a Clique-Percolation algorithm, or Kernighan-Lin algorithm. Embodiments may also involve using modularity-based algorithms to find communities, such as a Clauset-Newman-Moore greedy modularity maximization algorithm or a more general greedy modularity maximization algorithm. Some community detection algorithms may involve tree partitioning, such as by Lukes Algorithm and may involve measuring partitions, including by using centrality measures, or may involve validating partitions. In some embodiments, multiple community detection algorithms are run and subsequently blended by server computer 110 using a weighting.

2.3 Centrality Measures

In some embodiments, server computer system 110 may be programmed to calculate certain centrality measures with respect to certain nodes of network graph 400. Like community detection, centrality measures are a useful tool in network analysis. Moreover, some of the aforementioned network detection algorithms also involve calculating centrality measures, such as betweenness centrality. Centrality measures may be used to discover topological characteristics of the network graph 400 or portions thereof. Computer system 110 may be programmed to calculate centrality measures such as node degree centrality, eigen centrality, PageRank, closeness centrality, or betweenness centrality. In embodiments, a calculated centrality measure is a weighted blend of several centrality measure components.

In embodiments, computer system 110 may execute data processing instructions 140 formatted to cause calculation of a specific centrality measure of a second creator node 420 between a nearby first content node 415 and a nearby second content node 415 of a network graph 400. Said specific centrality measure may quantify an importance of the second creator node 420 in information flow of the network graph 400, a portion of the network graph 400, or a community 405. In particular, this specific centrality measure of the second creator node 420 (which is associated with the nearby second content node 415), between the nearby first content node 415 and nearby second content node 415, may represent a value of the second creator node 420 in achieving a flow of followers into a first creator node 420 associated with the nearby first content node 415, through the creation of collaborative digital content of a content type 402 corresponding to the nearby second content node 415.

2.4 Collaborator Recommendations 2.4.1 Content Type-Specific Recommendations

Figure 2A:
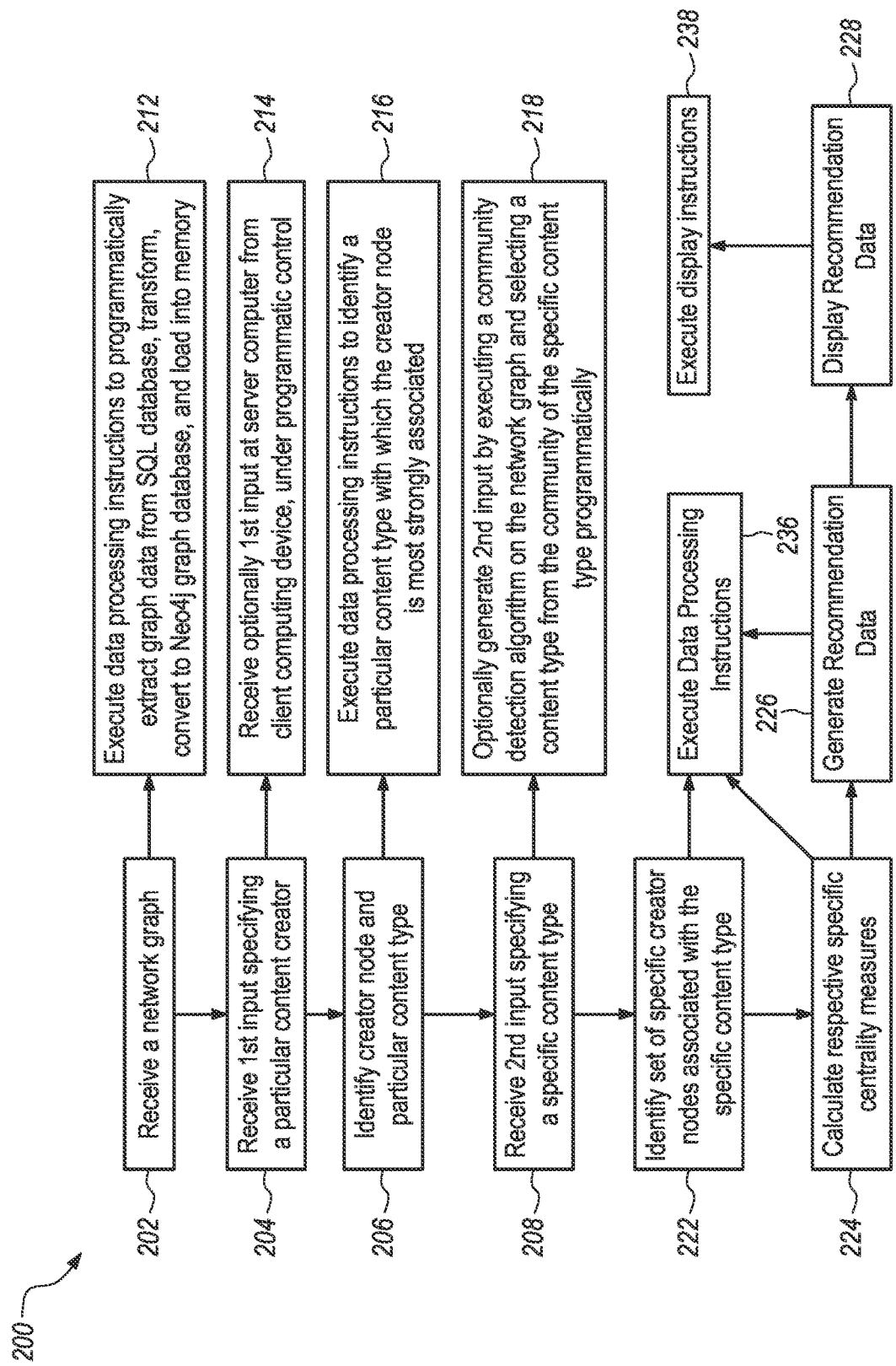
FIG. 2A illustrates an example process for recommending a collaborator for a particular content creator to create content with, of a specific content type, in an embodiment.

FIG. 2A illustrates an example computer-implemented process recommending a collaborator for a particular content creator to create content with, of a specific content type, in an embodiment.

The process of FIG. 2A is programmed to solve a first technical problem of how to programmatically receive information defining a network graph comprising creator nodes and content nodes and, using the received information, generate and display effective recommendations of sets of content creators for collaboration on digital media compositions. The process, as disclosed, also solves a second technical problem of how to minimize the number of digital messages that are transmitted, using less network bandwidth, to accomplish a logical connection of a content creator to another content creator that is capable of assisting with dissemination of a particular digital content item. A fundamental purpose of the recommendations processes described herein process are to establish digital communication links between devices, accounts, and/or user computers that did not previously exist, using an efficient transmission sequence of network messages.

FIG. 2A and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In embodiments, the method of FIG. 2A may be initiated responsive to receiving, from the client computing device 180 executing application program 186 and associated with a particular content creator, a request to initiate a recommendation process, and the request to initiate the recommendation process triggering control instructions to be transmitted to the client computing device 180.

In FIG. 2A, in an embodiment, a first digital media collaborator recommendation method 200 is programmed to start execution at step 202, at which server computer system 110 receives a network graph 400 comprising a plurality of creator nodes 420, content nodes 415, and connecting edges 430. This first digital media collaborator recommendation method 200 may be executed, for example, when a particular content creator 490 (FIG. 4B) desires to gain followers in a specific content type 404 (FIG. 4B) through collaboration with another content creator 412. In embodiments, network graph 400 may be received responsive to the transmission of control instructions formatted to retrieve the network graph from graph database 124. In embodiments, the network graph 400 may be received by, at step 212, generating the network graph 400 in graph database 124 responsive to the transmission of control instructions formatted to obtain graph information 128 from SQL database 122, transform or format the graph information 128, and store the network graph 400 in graph database 124.

In embodiments, receiving the network graph 400 at step 202, may comprise incorporating into the network graph 400 stored characterizations of the respective set of followers associated with each creator node 420 of the network graph 400 comprising a characterization of at least one of, a number of followers in the set, a measure of an activity level of the followers in the set, or preferences of the followers in the set being determined at least partly based on a history of at least a subset of the followers in the set at least one of creating, sharing, or liking short-form digital videos corresponding to one or more content types defined by the ontology. These stored characterizations may first be generated, for example, by using automatic API calls to one or more content host platforms 160 each comprising an API.

Referring again to FIG. 2A, at step 204, in an embodiment, server computer system 110 may receive a first input specifying the particular content creator 490. Receiving the first input may optionally involve, at step 214, receiving the first input at server computer 110 from the client computing device 180 executing application program 186 under programmatic control. In other embodiments, the first input may be generated by the server computer system 110 itself or received from another source.

At step 206, in an embodiment, server computer system 110 may identify the corresponding creator node 480 of the particular content creator 490 specified by the first input and identify, using the network graph 400, a particular content type 402 with which that creator node 480 is most strongly associated. In the example portion of a network graph 400 visualized in the example of FIG. 4B, the particular content creator 490 (labeled "C6") corresponds to creator node 480 and is connected by an edge 430 to demonstrate a strongest association to particular content type 402 ("Dancing") corresponding to content node 470. These identifications may be made at step 216 by server computer system 110 executing data processing instructions 140 formatted to cause identifying the particular content type 402 (in this example, "Dancing") with which particular creator node 480 is most strongly associated.

At step 208, in an embodiment, server computer system 110 may receive a second input specifying a specific content type (e.g., specific content type 404 shown in FIG. 4B ("Improv")). This may be a content type which the particular content creator 490 wants to grow his or her fan or follower base in. But, to do so, the particular content creator 490 may desire to discover which other content creator 412 would be an effective content creator 412 to collaborate with, for example in the production of a short-form video to be uploaded to a content host 160 like TIKTOK or INSTAGRAM.

In an embodiment, receiving the second input specifying a specific content type 404 at step 208 may involve executing step 218 to optionally generate the second input by programmatically executing a community detection algorithm on the network graph 400 and selecting a content type 404 from a community of a specific content node 410 corresponding to the specific content type 404.

In another embodiment, step 208 comprises transmitting to the client computing device 180 control instructions formatted to cause displaying of a prompt and a data entry field in a panel of the graphical user interface, the prompt comprising a text-based message requesting a specification of one or more desired content types; and receiving, from the client computing device, via the data entry field, the second input comprising the specification of the one or more desired content types, the particular content type being one of the one or more desired content types.

Figure 3A:
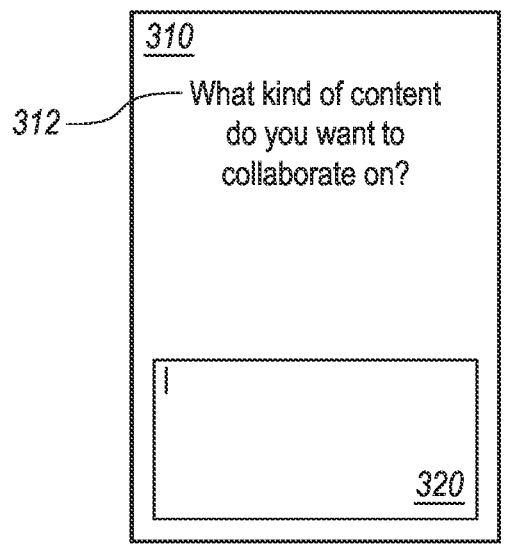
FIG. 3A depicts an example user interface through which input specifying a desired content type for collaboration may be received, featuring a text entry field, in an embodiment.
Figure 3B:
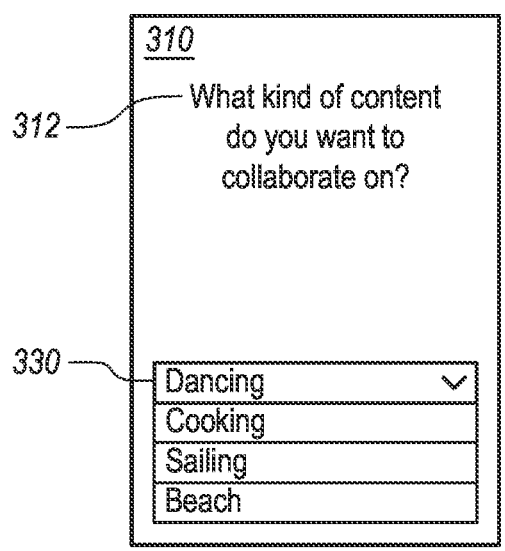
FIG. 3B depicts an example user interface through which input specifying a desired content type for collaboration may be received, featuring a drop-down list, in an embodiment.

FIG. 3A, FIG. 3B depict example user interfaces through which input specifying a desired content type for collaboration may be received, featuring a text entry field and a drop-down list, respectively, in embodiments. The panel 310, prompt 312, and data entry field shown in FIG. 3A, FIG. 3B may be generated, for example, by transmitting display instructions 130 to client computing device 180 executing application 186, thereby causing display in a GUI on device display 188. Referring first to FIG. 3A, panel 310 displays prompt 312 stating "What kind of content do you want to collaborate on?" which a user may respond to using text entry box 320. Referring next to FIG. 3B, panel 310 displays prompt 312 stating "What kind of content do you want to collaborate on?" which a user may respond to using drop down menu 330. One of ordinary skill in the art will recognize that there are various other functionally equivalent or functionally similar ways of prompting for and receiving the second input under full programmatic control.

Referring again to FIG. 2A, at step 222, in an embodiment, server computer system 110 may identify a set of specific creator nodes 460 (FIG. 4B) associated with the specific content node 410 corresponding to the specific content type 404. There may be some overlap between the set of specific creator nodes 460 associated with the specific content type 404 and a set of creator nodes 465 associated with the content node 470 corresponding to the content type 402 most strongly associated with the particular content creator 490. The identification process of step 222 may proceed by executing data processing instructions 140 at step 236.

At step 224, in an embodiment, server computer system 110 may, for each node of the set of specific creator nodes 460 (FIG. 4B), programmatically calculate a respective specific centrality measure of that node between the content node 470 corresponding to the particular content type 402 and the content node corresponding to the specific content type 404, based, in part, on stored characterizations of the set of followers associated with each node of the set of specific creator nodes 460. The calculation process of step 224 may proceed by executing data processing instructions 140 at step 236, for example, by computing specific centrality measures by the techniques described with greater specificity in section 2.3 of this disclosure.

At step 226, in an embodiment, server computer system 110 may programmatically generate recommendation data identifying the content creator 442 (FIG. 4B) corresponding to the specific creator node 450 with the highest calculated specific centrality measure in step 224. In the example visualization of FIG. 4B, the specific creator node 450 has the highest calculated specific centrality measure between the content node 470 corresponding to Dancing and the content node 410 corresponding to Improv. Node 450 exists in the overlap between the set of creator nodes 465 associated with the particular content type 402 and the set of creator nodes 460 associated with the specific content type 404. For any content creator strongly associated with Dancing, content creator 442 (labeled "C8" in FIG. 4B) might be an excellent choice of a content creator with which to collaborate in the creation of digital media content, for example short-form videos to be published to a content host 160 such as TIKTOK or INSTAGRAM. Based on the high specific centrality of node 450 between Dancing and Improv, content creator 442 probably produces both Dancing and Improv content and may have a large set of active and real followers with preferences suggesting that they would be receptive to viewing content produced by particular content creator 490 of the type "Improv" or of the type "Improv+ Dancing".

In embodiments, recommendation data may be any data that reflects the specific centrality measures programmatically calculated at step 224. This data may comprise one or more recommendations of content creators 412 for particular content creator 490 (labeled "C6" in FIG. 4B to collaborate with). The recommendation data may also be based on a variety of other factors, such as a collaboration price associated with an offer for collaboration by the various content creators reflected in the network graph 400. The generation process of step 226 may proceed by executing data processing instructions 140 at step 236.

At step 228, in an embodiment, server computer 110 may cause the display of recommendation data. The display process of step 228 may proceed at step 238, by, for example, transmitting display instructions 130 to client computing device 180 executing application 186, thereby causing display of the generated recommendation data in a GUI on a device display 188 of the client computing device 180. The recommendation data may be displayed, for example, as a textual suggestion in a panel of a GUI displayed on device display 188 of client computing device 180, such as a text string like "We recommend you collaborate with content creator C8 in producing an Improv video." Displaying the recommendation data may also comprise displaying a portrait of the content creator 442 (labeled "C8" in FIG. 4B) suggested for collaboration and other associated information such as a collaboration price for a particular form of composition such as a duet, a stitch, a sound, a comment, or a remix on TIKTOK or INSTAGRAM.

2.4.2 General Recommendations Using Community Detection

Figure 2B:
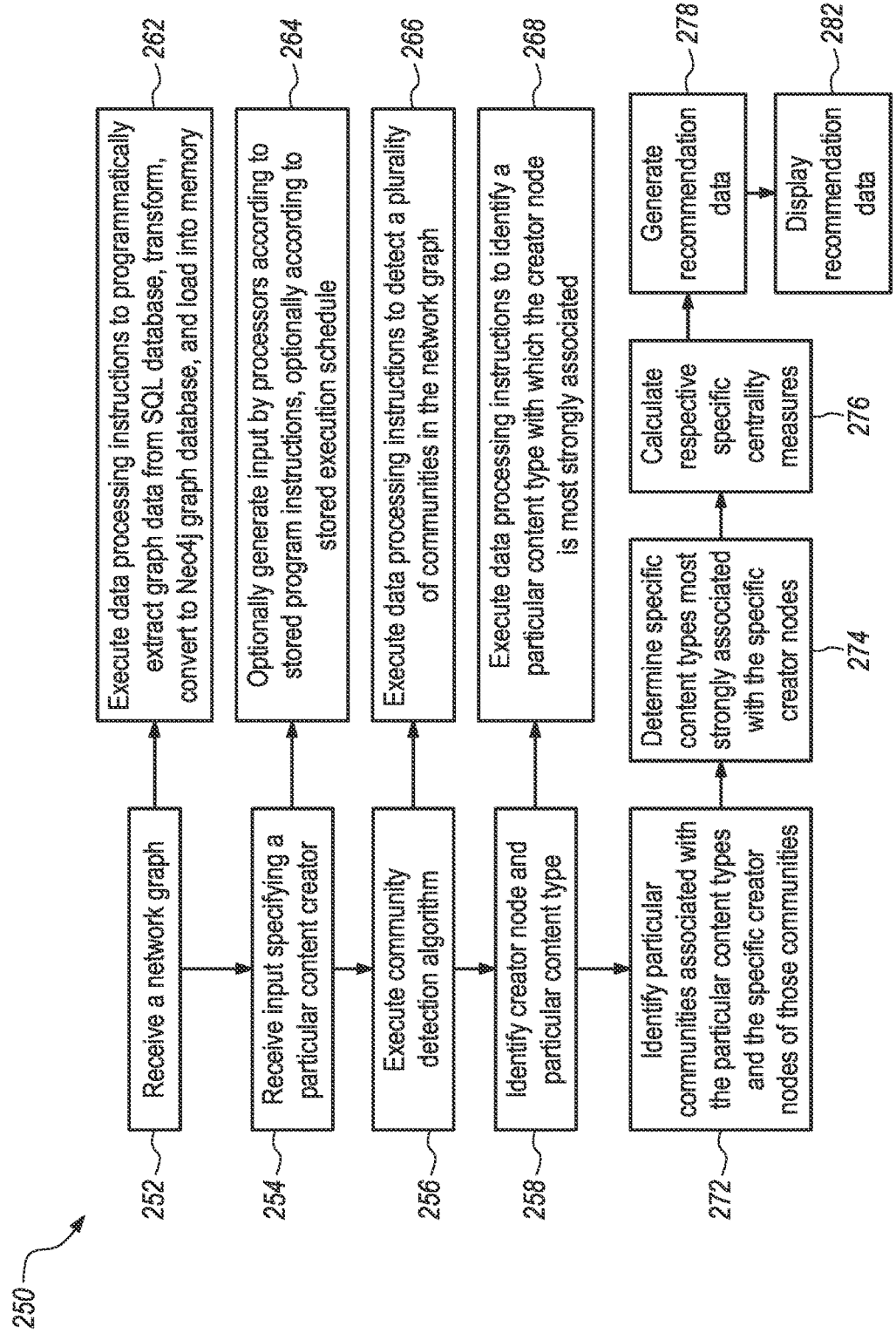
FIG. 2B illustrates an example process for recommending a collaborator for a particular content creator to create content with, without restricting the content type, using a community detection algorithm, in an embodiment.

FIG. 2B illustrates an example process for recommending a collaborator for a particular content creator to create content with, without restricting the content type, using a community detection algorithm, in an embodiment.

As depicted in FIG. 2B, a second digital media collaborator recommendation method 250 may be programmed to start execution at step 252, at which server computer system 110 receives a network graph 400 comprising a plurality of creator nodes 420, content nodes 415, and connecting edges 430. This second digital media collaborator recommendation method 250 may be executed, for example, when a particular content creator 490 (FIG. 4B) desires to gain followers in any content type defined by the ontology through collaboration with another content creator 412. In embodiments, network graph 400 may be received responsive to the transmission of control instructions formatted to retrieve the network graph from graph database 124. In embodiments, the network graph 400 may be received by, at step 262, generating the network graph 400 in graph database 124 responsive to the transmission of control instructions formatted to obtain graph information 128 from SQL database 122, transform or format the graph information 128, and store the network graph 400 in graph database 124.

In embodiments, receiving the network graph 400 at step 252, may comprise incorporating into the network graph 400 stored characterizations of the respective set of followers associated with each creator node 420 of the network graph 400 comprising a characterization of at least one of, a number of followers in the set, a measure of an activity level of the followers in the set, or preferences of the followers in the set being determined at least partly based on a history of at least a subset of the followers in the set at least one of creating, sharing, or liking short-form digital videos corresponding to one or more content types defined by the ontology. These stored characterizations may first be generated, for example, by using automatic API calls to one or more content host platforms 160 each comprising an API.

Referring again to FIG. 2B, at step 254, in an embodiment, server computer system 110 may receive an input specifying the particular content creator 490. Receiving the input may involve, at step 254, receiving the input at server computer 110 from the client computing device 180 executing application program 186 under programmatic control. In other embodiments, the input may be generated by the server computer system 110 itself or received from another source. Optionally, at step 264, the input is automatically periodically generated according to an execution schedule stored in memory of the server computer system 110. Step 264 may be implemented, for example, in platform embodiments where platform users are periodically automatically presented with recommendations by the server computer system 110 transmitting display instructions 130 to client computing device 180 executing application 186, thereby causing display of generated recommendation data in a GUI on a device display 188 of the client computing device 180.

At step 256, in an embodiment, server computer system 110 may programmatically determine, using a community detection algorithm, a plurality of communities 405 (FIG. 4C) detected to exist within the network graph 400, each community 405 comprising both a corresponding set of community nodes which is a subset of the plurality of nodes of the network graph and a corresponding set of community edges that connect certain nodes of the corresponding set of community nodes based on the community detection algorithm. In embodiments, the community detection process of step 256 may be effectuated by the server computer system 110 executing data processing instructions 140 at step 266, the data processing instructions 140 formatted to cause detections of a plurality of communities in the network graph 400, for example, by the techniques described with greater specificity in section 2.2 of this disclosure.

At step 258, in an embodiment, server computer system 110 may identify the corresponding creator node 480 (FIG. 4B) of the particular content creator 490 specified by the first input and identify, using the network graph 400, one or more particular content types 402 with which that creator node 480 is most strongly associated. In the example portion of a network graph 400 visualized in the example of FIG. 4B, the particular content creator 490 (labeled "C6") corresponds to creator node 490 and is connected by an edge 430 to demonstrate a strongest association to particular content type 402 ("Dancing") corresponding to content node 470. These identifications may be made at step 268 by server computer system 110 executing data processing instructions 140 formatted to cause identifying the particular content types 402 (in this example, "Dancing") with which particular creator node 480 is most strongly associated. In the visualization of FIG. 4B, only one particular content type 402 is identified, but in other embodiments, method 250 can comprise identifying a plurality of particular content types 402 each corresponding to a particular content node 470 within a respective one of a plurality of particular community 405 sub-graphs (FIG. 4C) detected in the network graph 400.

At step 272, in an embodiment, server computer system 110 may programmatically identify each of the plurality of particular communities 405 comprising a particular content node 470 corresponding to one of the particular content types 402 and programmatically identify a set of specific creator nodes 460 associated with at least one of the one or more particular content types 402 and comprised by at least one of the one or more particular communities 405. This identification process may be accomplished, for example, by the server computer system 110 executing data processing instructions 140 formatted to cause said identifications.

At step 274, in an embodiment, server computer system 110 may programmatically determine the specific content types 404 (FIG. 4B) most strongly associated with the specific creator nodes 460 identified at step 272. This determination process may be accomplished, for example, by the server computer system 110 executing data processing instructions 140 formatted to cause said determinations. Although FIG. 4B only depicts a single specific content type 404, method 250 can comprise identifying a plurality of specific content types 404 each corresponding to a corresponding content node 410 of the network graph 400.

At step 276, in an embodiment, server computer system 110 may, for each node of the set of specific creator nodes 460 (FIG. 4B), programmatically calculate a respective specific centrality measure of that node between each content node 470 corresponding to each of the particular content types 402 and each content node corresponding to each of the specific content types 404, based, in part, on stored characterizations of the set of followers associated with each node of the set of specific creator nodes 460. The calculation process of step 276 may be effectuated by executing data processing instructions 140, for example, by computing specific centrality measures by the techniques described with greater specificity in section 2.3 of this disclosure.

At step 278, in an embodiment, server computer system 110 may programmatically generate recommendation data identifying a prime content creator 442 (FIG. 4B) corresponding to the specific creator node 450 with the highest calculated specific centrality measure in step 276. In the example visualization of FIG. 4B, the specific creator node 450 has the highest calculated specific centrality measure between the content node 470 corresponding to Dancing and the content node 410 corresponding to Improv. Node 450 exists in the overlap between the set of creator nodes 465 associated with the particular content type 402 and the set of creator nodes 460 associated with the specific content type 404. For any content creator strongly associated with Dancing, content creator 442 (labeled "C8" in FIG. 4B) might be an excellent choice of a content creator with which to collaborate in the creation of digital media content, for example short-form videos to be published to a content host 160 such as TIKTOK or INSTAGRAM. Based on the high specific centrality of node 450 between Dancing and Improv, content creator 442 probably produces both Dancing and Improv content and may have a large set of active and real followers with preferences suggesting that they would be receptive to viewing content produced by particular content creator 490 of the type "Improv" or of the type "Improv+Dancing".

In embodiments, recommendation data may be any data that reflects the specific centrality measures programmatically calculated at step 276. This data may comprise one or more recommendations of content creators 412 for particular content creator 490 (labeled "C6" in FIG. 4B to collaborate with). The recommendation data may also be based on a variety of other factors, such as a collaboration price associated with an offer for collaboration by the various content creators reflected in the network graph 400. The generation process of step 278 may be effectuated, for example, by server computer system 110 executing data processing instructions 140.

In embodiments, a plurality of the content creators including the prime content creator may each be respectively associated with a corresponding collaboration price in the memory 120 of the server computer system 110. In embodiments, the recommendation data may further identify one or more additional content creators corresponding to creator nodes that are associated with similar content types as the creator node corresponding to the prime content creator, the one or more additional content creators each being associated with a collaboration price less than the collaboration price associated with the prime content creator. These additional recommendations may be generated by the server computer 110 executing program instructions formatted to detect a similarity between the prime content creator and the other content creators of the network graph to detect effective proxies for the prime content creator. In embodiments, a recommended proxy may be a series of content creators recommended for collaboration, collaboration with the content creators of the series being predicted to effectively replicate an effect of collaborating with a single prime content creator.

At step 282, in an embodiment, server computer system 110 may cause the display of recommendation data. The display process of step 228 may proceed at step 238, by, for example, transmitting display instructions 130 to client computing device 180 executing application 186, thereby causing display of the generated recommendation data in a GUI on a device display 188 of the client computing device 180. The recommendation data may be displayed, for example, as a textual suggestion in a panel of a GUI displayed on device display 188 of client computing device 180, such as a text string like "We recommend you collaborate with content creator C8 in producing an Improv video." Displaying the recommendation data may also comprise displaying a portrait of the content creator 442 (labeled "C8" in FIG. 4B) suggested for collaboration and other associated information such as a collaboration price for a particular form of composition such as a duet, a stitch, a sound, a comment, or a remix on TIKTOK or INSTAGRAM.

In embodiments, server computer system 110 may execute data processing instructions 140 formatted to cause the calculation and digital storage of an ex-ante predicted causal impact of a recommended collaboration, in other words, a causal inference. The predicted causal impact may be expressed, for example, in terms of an increased follower count of the particular content creator or by a change in another metric. In an embodiment, data associated with the predicted causal impact may be displayed with the recommendation data at step 282.

In particular embodiments, a causal inference may be programmatically determined by server computer system 110 at a point in time after the recommendation data is displayed at step 282. For example, server computer 110 may be programmed to execute data processing instructions 140 formatted to cause calculation of an ex-post causal inference using a "difference of differences" method or another method after a specific period of time has passed since the recommendation data was displayed, according to the execution schedule 126 stored in memory 120 of server computer system 110, or at another time. Server computer 110 may be programmed to execute causal inference techniques by calculating a baseline trend of a content creator's follower count or other relevant metric before a "treatment" (a recommended collaboration) and then attributing an increase in that metric to the recommended collaboration. Server computer system 110 may also generate this inference data by executing data processing instructions 140 formatted to cause the execution of other statistical forecasting methods including other time series forecasting methods. In embodiments, server computer system 110 may execute display instructions 130 formatted to cause display of the aforementioned inference data in a graphical user interface displayed by client computing device 180 in device display 188.

In particular instances, a content creator may choose to not pursue a collaboration that was programmatically recommended by server computer system 110, for example, at step 282 of method 250. In embodiments, in such an instance, server computer system 110 may execute programmed instructions to generate counterfactual information related to a causal inference and cause that counterfactual information to be displayed by client computing device 180. Said counterfactual information may inform the particular content creator of benefits missed out on by that content creator as a result of not engaging in the recommendation displayed at step 282. For example, the displayed counterfactual information may represent a programmatically inferred increased growth rate in the particular content creator's followers or a programmatically inferred increased level set (jump discontinuity) in the particular content creator's followers that was not obtained by that content creator because the content creator did not participate in the collaboration recommended by method 250 or another method disclosed herein. In other instances, in embodiments, for a content creator that chooses to participate in a recommended collaboration, counterfactual information can be similarly programmatically generated and caused to be displayed representing a causal prediction of how that particular content creator's follower count would have evolved over time had the content creator not participated in the recommended collaboration.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
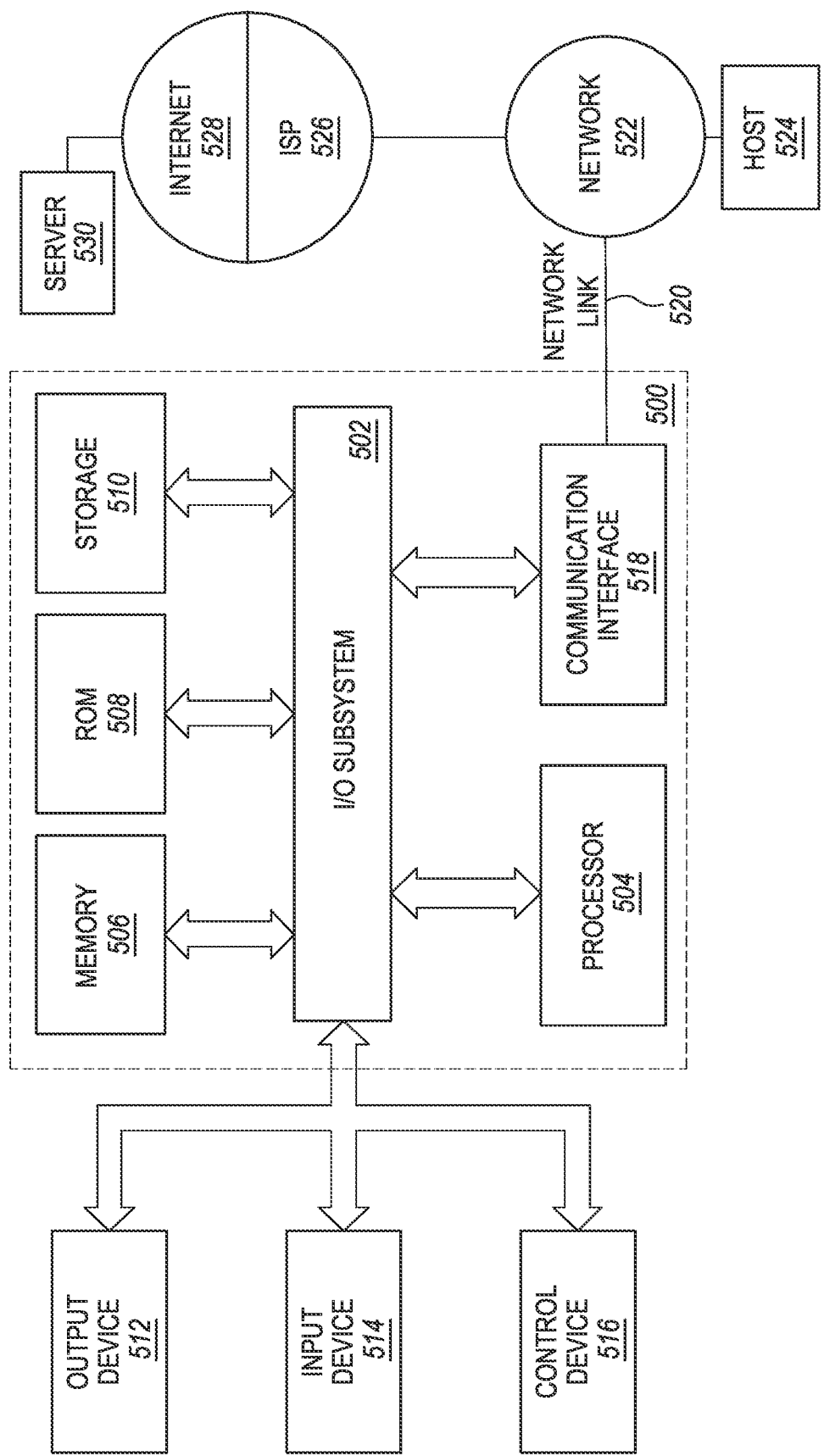
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on output device 512 (e.g., a display). The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to a bus of input/output subsystem 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, Internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more processors, cause:

receiving, at a server computer, a representation of a network graph comprising a plurality of nodes and a plurality of edges, the plurality of nodes comprising a plurality of creator nodes and a plurality of content nodes, each content node corresponding to a respective content type of a plurality of content types defined by an ontology, each creator node corresponding to a respective content creator, each creator node being associated with one or more respective content types and a respective set of followers, and each creator node being connected, by an edge, to each content node that corresponds to a content type with which that creator node is associated;

programmatically determining, using a community detection algorithm, a plurality of communities detected to exist within the network graph, each community comprising both a corresponding set of community nodes which is a subset of the plurality of nodes of the network graph and a corresponding set of community edges that connect certain nodes of the corresponding set of community nodes based on the community detection algorithm;

receiving, at the server computer, an input comprising a specification of a particular content creator;

programmatically identifying the creator node corresponding to the particular content creator and one or more particular content types with which that creator node is most strongly associated;

programmatically identifying one or more particular communities that comprise a content node corresponding to one of the one or more particular content types;

programmatically identifying a set of specific creator nodes associated with at least one of the one or more particular content types and comprised by at least one of the one or more particular communities;

for each node of the set of specific creator nodes, programmatically determining one or more specific content types with which that creator node is most strongly associated;

for each node of the set of specific creator nodes, programmatically calculating a respective specific centrality measure of that node between each content node corresponding to each of the particular content types and each content node corresponding to each of the specific content types, based, in part, on stored characterizations of the set of followers of each node of the set of specific creator nodes;

programmatically generating recommendation data identifying a prime content creator corresponding to the specific creator node with the highest calculated specific centrality measure, the recommendation data also identifying the content type most strongly associated with the specific creator node of the prime content creator; and causing to be displayed, in a graphical user interface displayed on a display of a client computing device, the recommendation data.

2. The computer-readable media of claim 1, the input being received from the client computing device.

3. The computer-readable media of claim 1, the input being received from the server computer.

4. The computer-readable media of claim 3, the input being automatically periodically generated according to an execution schedule stored in memory of the server computer.

5. The computer-readable media of claim 1:

a plurality of the content creators including the prime content creator each being respectively associated with a corresponding collaboration price; and the recommendation data further identifying one or more additional content creators corresponding to creator nodes that are associated with similar content types as the creator node corresponding to the prime content creator, the one or more additional content creators each being associated with a collaboration price less than the collaboration price associated with the prime content creator.

6. The computer-readable media of claim 1, further comprising instructions which, when executed by the one or more processors, cause causing to be displayed, in the graphical user interface, inference data representing at least one of an ex-ante or ex-post causal inference prediction of an effect of the particular content creator participating in a collaboration with the identified prime content creator.

\* \* \* \* \*